Patented July 15, 1930

1,770,685

UNITED STATES PATENT OFFICE

CLYDE C. DE WITT, OF HOUGHTON, MICHIGAN

MOLDING SAND AND MATERIAL FOR TREATING SAME

No Drawing.   Application filed April 8, 1929.   Serial No. 353,693.

This invention relates to molding sands and to a material for conditioning or reconditioning the same, the principal object being the provision of a material which closely approaches the original binders common to molding sands and which may be used for treating natural molding sand which, when removed from pits or the like, is lean in binder; or may be used to recondition molding sands which, from continued use, have lost their proper binding characteristics, or may even be used for producing a molding sand from an originally naked sand.

Molding sands as they occur in their natural states, are subject to quite a wide variation of properties, and particularly in binders. The upper portion of a natural bed of molding sand may be over-rich in binding characteristics, the central portion may be satisfactory for use, and the bottom portion may be too lean in binding materials. By properly mixing the entire strata, a product of substantially uniform and desirable characteristics may be obtained. In some cases, even when so mixed, there may still be a lack of sufficient binding material in the mixture, in which case a suitable amount of artificial or other binding material may be added to the mass, or else, before mixing a portion of the lower strata lean in binder, may be discarded, in which case it is lost.

In any of the natural molding sands, the sand loses part of its binding characteristics through continued use, in which case it must be thrown away after reaching a certain weakness, or else an artificial binder must be added. Repeated heating to high temperatures causes the deterioration of the binding characteristics of molding sand. This deterioration is due largely to the irreversible pektization of the clay particles which form the binder.

It has heretofore been suggested that clay, as it occurs in its natural state, be employed for the purpose of rejuvenating or restoring spent molding sand to its original condition, the method employed generally being simply mixing finely divided clay with the molding sand. While this does increase the binder in the molding sand, I have found that it is not at all satisfactory, nor does it approach the desirable characteristics that the binder in the natural molding sand is endowed with. I have found that if each particle of clay which is to be used as a binder is coated with a film of iron hydrogel, the resulting product exhibits the most desirable properties. This coating of iron hydrogel cannot be removed from the clay by simply washing with water; I have found that it is necessary to submit the clay to an acid treatment in order to remove it.

This iron hydrogel coated clay may be employed as an additional binding agent for enriching a naturally lean molding sand and will result in a product equal in all respects to a natural molding sand of original proper richness in binder, it may be employed to rejuvenate spent or partially spent molding sand, and may even be employed with naturally naked sand, such as shore sand having no inherent molding characteristics in its natural state, to produce an acceptable molding mixture.

Accordingly, it is one of the objects of the present invention to provide an artificial binder for molding sands comprising clay treated with iron hydrogel so as to coat the same therewith, whereby the clay in being mixed with the molding sand, will impart to the sand the same desirable binding characteristics for molding purposes as a high class natural molding sand is endowed with.

The method I employ in coating the particles of clay with iron hydrogel is to allow the clay particles to come into contact with a dilute solution of iron hydrosol. The adsorption of the iron hydrosol takes place over a wide range in acidity, but I prefer the range of from 4.5 pH to 6.2 pH. If the addition of clay to the hydrosol sensibly changes the pH value of the hydrosol, it is best to control the acidity by means of suitable addition agents which will not sensibly lower the fusibility of the clay.

When the clay containing the iron hydrogel adsorbed upon its grains is mixed in a wet or dry or relatively moist state with a sand having the proper characteristics, a usable molding material is formed, which is materially stronger and more suitable for molding purposes than the untreated clay-sand combination. Further, the moist treated clay, when formed and dried, is harder and less subject to abrasion.

The function of the hydrogel in the moist state is to provide means of contacting particles. The strength of the clay samples in the moist state is due to the tensile strength of the water at the contact points, to the grain packing, and to the percentage of moisture. When the material thus treated is packed in a moist condition, the hydrogel films coalesce. As these coalesced films dry their particles become both interlocked and cemented. Particles which have been separated in a dry state must, of course, by moistened, and time must be allowed for the gelatinous coatings to swell and to accomplish once more the coalescence of films.

The method of preparing clay for use as a molding sand binder which I prefer, is to treat the clay in suspension with a solution of iron hydrosal having a pH of between 4.5 pH and 6.2 pH. It is advisable that before treatment the clay contain a minimum of soluble material which can effect the precipitation of the colloidal iron in the hydrosol before it comes into actual contact with the clay particles. After such treatment the wet clay may be stored in the moist condition until used or it may be dried, pulverized, wetted, and mixed with the molding sand as required. The partially or totally dried pulverized clay may be caused to adsorb further quantities of the iron hydrogel, the total quantity of iron hydrogel adsorbed depending on the final properties desired of the clay binder.

The iron hydrosol can be prepared in the following manner: Allow a dilute solution of ferric chloride to dissolve all the hydrated iron oxide or ferric hydroxide that it can when the temperature of the solution is approximately 90° to 100° C. When properly prepared, such a solution will contain approximately one part of ferric chloride to fifteen parts iron oxide. The resultant colloidal solution will be a clear, amber-colored liquid. The pH value of the iron hydrosol may be adjusted by means of suitable neutralizing agents or buffers, the function of which can be obtained from any text-book on physical or electro-chemistry.

Another method of preparing the iron hydrosol is to centrifuge a solution of ferric chloride partially neutralized with ammonia, so that the particles of the iron hydrosol are separated and are washed free of the excess ferric chloride and ammonium chloride. The washed iron hydrogel can then be resuspended in a solution of the correct acidity by agitating or by passing the mixture of acid solution and iron hydrogel through a colloid mill. Various other methods may be employed for preparing the iron hydrosol, but as this is outside of the scope of the present invention, it is not thought necessary to explain the same here.

Although in the above description I have described the coating which I provide for the clay particles as being iron hydrogel, I do not limit myself to this particular coating, inasmuch as other coatings of a like nature may be substituted with equally satisfactory results, and it is to be understood in the following claims that where the term "iron hydrogel" is employed, it is to be interpreted as meaning iron hydrogel or any other inorganic coating of like nature designed to effect the same result.

The same thought is true in connection with the word "clay" which I have used in the specification and which is used in the claims. There is, of course, a relatively large number of colloidal materials of a composition and nature similar to what is commonly known as clay, which are known by other names, and which may be employed in the same manner and for the same purpose. The word "clay," as used herein, is to be interpreted accordingly.

Formal changes may be made in the specific embodiment of the invention described without departing from the spirit or substance of the broad invention, the scope of which is commensurate with the appended claims.

What I claim is:

1. A molding sand binder comprising clay the individual particles of which are provided with substantially insoluble metallic gel coating.

2. An artificial molding sand binder comprising clay the individual particles of which are artificially provided with a coating of iron hydrogel.

3. A molding material material comprising sand and a binder of iron hydrogel coated clay.

4. The method of preparing an artificial binder for molding sands comprising in subjecting clay particles to iron hydrosol whereby to cause said particles to be provided with a coating of iron hydrogel.

5. The method of preparing an artificial binder for molding sands comprising in subjecting clay particles to an iron hydrosol solution having a pH value of between 4.5 and 6.2.

CLYDE C. DE WITT.